(12) United States Patent
Mathai et al.

(10) Patent No.: US 11,199,665 B2
(45) Date of Patent: Dec. 14, 2021

(54) OPTICAL DEVICE FOR REDIRECTING OPTICAL SIGNALS

(71) Applicant: Hewlett Packard Enterprise Development LP, Houston, TX (US)

(72) Inventors: Sagi Varghese Mathai, Sunnyvale, CA (US); Paul Kessler Rosenberg, Sunnyvale, CA (US); Kevin B. Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/775,215

(22) Filed: Jan. 28, 2020

(65) Prior Publication Data

US 2021/0231879 A1    Jul. 29, 2021

(51) Int. Cl.
*G02B 6/35* (2006.01)

(52) U.S. Cl.
CPC .......... *G02B 6/356* (2013.01); *G02B 6/3512* (2013.01)

(58) Field of Classification Search
CPC ..... G02B 6/356; G02B 6/3512; G02B 385/18
See application file for complete search history.

(56) References Cited

U.S. PATENT DOCUMENTS

| | | | |
|---|---|---|---|
| 3,861,788 A | 1/1975 | Webster et al. | |
| 4,176,916 A | 12/1979 | Carpenter et al. | |
| 4,701,591 A * | 10/1987 | Masaki | B23K 26/0673 219/121.61 |
| 4,988,157 A * | 1/1991 | Jackel | G02B 6/3538 385/17 |
| 5,255,332 A * | 10/1993 | Welch | B82Y 20/00 385/17 |
| 5,699,462 A * | 12/1997 | Fouquet | G02B 6/3538 347/1 |
| 5,781,341 A * | 7/1998 | Lee | G02B 26/007 359/578 |
| 5,796,888 A * | 8/1998 | Furukawa | G02B 6/3508 385/20 |
| 6,008,469 A * | 12/1999 | Kawamura | B23K 26/067 219/121.74 |
| 6,160,928 A * | 12/2000 | Schroeder | G02B 6/3562 385/17 |
| 6,198,856 B1 * | 3/2001 | Schroeder | G02B 6/359 385/16 |
| 6,347,164 B1 * | 2/2002 | Rudkevich | G02B 6/266 359/489.14 |

(Continued)

*Primary Examiner* — Andrew Jordan
(74) *Attorney, Agent, or Firm* — Sheppard Mullin Richter & Hampton LLP

(57) ABSTRACT

Examples include an optical device for redirecting optical signals. The optical device includes a plurality of input ports, a plurality of optical blocks such that at least one optical block of the plurality of optical blocks aligned to each input port of the plurality of input ports, and a plurality of output ports. The plurality of input ports may direct a plurality of optical signals of selective wavelengths to a first direction. Each of the optical blocks may be movable to a plurality of positions to selectively redirect the respective optical signal of the plurality of signals from the first direction to a second direction to one or more output ports of the plurality of output ports that may receive the one or more optical signals redirected to the second direction.

18 Claims, 8 Drawing Sheets

(56) References Cited

U.S. PATENT DOCUMENTS

| | | | | |
|---|---|---|---|---|
| 6,366,715 B1* | 4/2002 | Wang | ............... | H04Q 11/0005 385/17 |
| 6,453,083 B1* | 9/2002 | Husain | ............... | G02B 6/3514 385/17 |
| 6,463,192 B1* | 10/2002 | Kapany | ............... | G02B 6/35 385/17 |
| 6,473,544 B1* | 10/2002 | Daneman | ............... | G02B 6/3582 385/16 |
| 6,493,479 B1* | 12/2002 | Briggs | ............... | H04Q 11/0005 385/15 |
| 6,498,682 B2 | 12/2002 | Glance et al. | | |
| 6,509,961 B1* | 1/2003 | Schroeder | ............... | G02B 6/3538 356/73.1 |
| 6,522,801 B1* | 2/2003 | Aksyuk | ............... | B81C 1/00666 385/16 |
| 6,574,384 B1* | 6/2003 | Cannell | ............... | G02B 6/3586 385/16 |
| 6,580,847 B2* | 6/2003 | Cook | ............... | H04Q 11/0005 385/16 |
| 6,650,804 B2* | 11/2003 | Mills | ............... | G02B 6/3542 385/16 |
| 6,668,107 B2* | 12/2003 | DePue | ............... | G02B 6/122 385/15 |
| 6,760,503 B1* | 7/2004 | Hermann | ............... | G02B 6/3548 385/16 |
| 6,768,572 B2* | 7/2004 | Romanovsky | ............... | G02F 1/0551 359/245 |
| 6,768,830 B1* | 7/2004 | Lacey | ............... | G02B 6/3538 385/15 |
| 6,782,201 B2* | 8/2004 | Yamamoto | ............... | H04J 14/0283 398/107 |
| 6,876,788 B2* | 4/2005 | Schroeder | ............... | G02B 6/3538 385/17 |
| 6,886,964 B2 | 5/2005 | Gardiner et al. | | |
| 7,016,560 B2* | 3/2006 | Ticknor | ............... | B01F 13/0076 385/15 |
| 7,280,735 B2 | 10/2007 | Thibault et al. | | |
| 7,298,954 B2* | 11/2007 | Liu | ............... | G02B 6/266 385/140 |
| 7,444,043 B2* | 10/2008 | Fan | ............... | G02B 6/3514 385/16 |
| 8,320,426 B2* | 11/2012 | Grapov | ............... | G02B 6/4214 372/107 |
| 10,088,634 B2* | 10/2018 | Pelc | ............... | G02B 6/272 |
| 10,180,616 B2* | 1/2019 | Holmes | ............... | G02B 6/3548 |
| 10,527,798 B2* | 1/2020 | Matsuda | ............... | G02B 27/30 |
| 10,551,624 B2* | 2/2020 | Rothberg | ............... | G02B 27/0972 |
| 10,699,860 B2* | 6/2020 | Schuler | ............... | G02B 6/353 |
| 2001/0002940 A1* | 6/2001 | Glance | ............... | G02B 26/007 385/18 |
| 2001/0024548 A1* | 9/2001 | Hamanaka | ............... | G02B 6/3582 385/33 |
| 2002/0018257 A1* | 2/2002 | Notheis | ............... | B23K 26/0884 219/121.6 |
| 2002/0071627 A1* | 6/2002 | Smith | ............... | H04Q 11/0005 385/15 |
| 2002/0164114 A1* | 11/2002 | Golub | ............... | G02B 6/2931 385/18 |
| 2003/0002030 A1* | 1/2003 | Schroeder | ............... | G02B 6/3538 356/73.1 |
| 2003/0020913 A1* | 1/2003 | Richard | ............... | G02B 6/2938 356/399 |
| 2003/0035301 A1* | 2/2003 | Gardiner | ............... | A61N 5/0619 362/583 |
| 2004/0156581 A1* | 8/2004 | Golub | ............... | G02B 6/356 385/18 |
| 2005/0135102 A1* | 6/2005 | Gardiner | ............... | G01J 3/10 362/276 |
| 2005/0271351 A1* | 12/2005 | Thibault | ............... | G02B 26/007 385/147 |
| 2006/0072180 A1* | 4/2006 | Tamura | ............... | B81B 3/0051 359/225.1 |
| 2006/0291794 A1* | 12/2006 | Liu | ............... | G02B 6/358 385/140 |
| 2013/0051409 A1* | 2/2013 | Grapov | ............... | G02B 27/145 372/6 |
| 2016/0077330 A1* | 3/2016 | Millar | ............... | H04Q 11/0005 398/48 |
| 2017/0293137 A1* | 10/2017 | Zhao | ............... | G02B 26/08 |
| 2018/0106970 A1* | 4/2018 | Takigawa | ............... | G02B 26/08 |
| 2018/0173000 A1* | 6/2018 | Rothberg | ............... | G02B 27/0911 |
| 2019/0030641 A1* | 1/2019 | Nagayasu | ............... | G02B 6/425 |
| 2019/0064441 A1* | 2/2019 | Matsuda | ............... | G02B 6/3514 |
| 2019/0179078 A1* | 6/2019 | Kuritsyn | ............... | G01N 21/7703 |
| 2020/0124864 A1* | 4/2020 | Rothberg | ............... | G02B 27/0916 |
| 2020/0264397 A1* | 8/2020 | Herman | ............... | G02B 6/385 |
| 2021/0231879 A1* | 7/2021 | Mathai | ............... | G02B 6/356 |

\* cited by examiner

OPTICAL DEVICE FOR REDIRECTING OPTICAL SIGNALS

BACKGROUND

An optical device (e.g., an optical switch) enables optical signals in optical fibers or photonic integrated optical circuits (PICs) to be selectively switched from one circuit to another. An optical switch may operate mechanically, such as physically shifting an optical fiber to drive one or more alternative fibers, or by electro-optic effects, magneto-optic effects, MEMS (Micro-Electro Mechanical System), or other methods.

BRIEF DESCRIPTION OF THE DRAWINGS

The following detailed description references the drawings, wherein.

DETAILED DESCRIPTION

Figure 1:
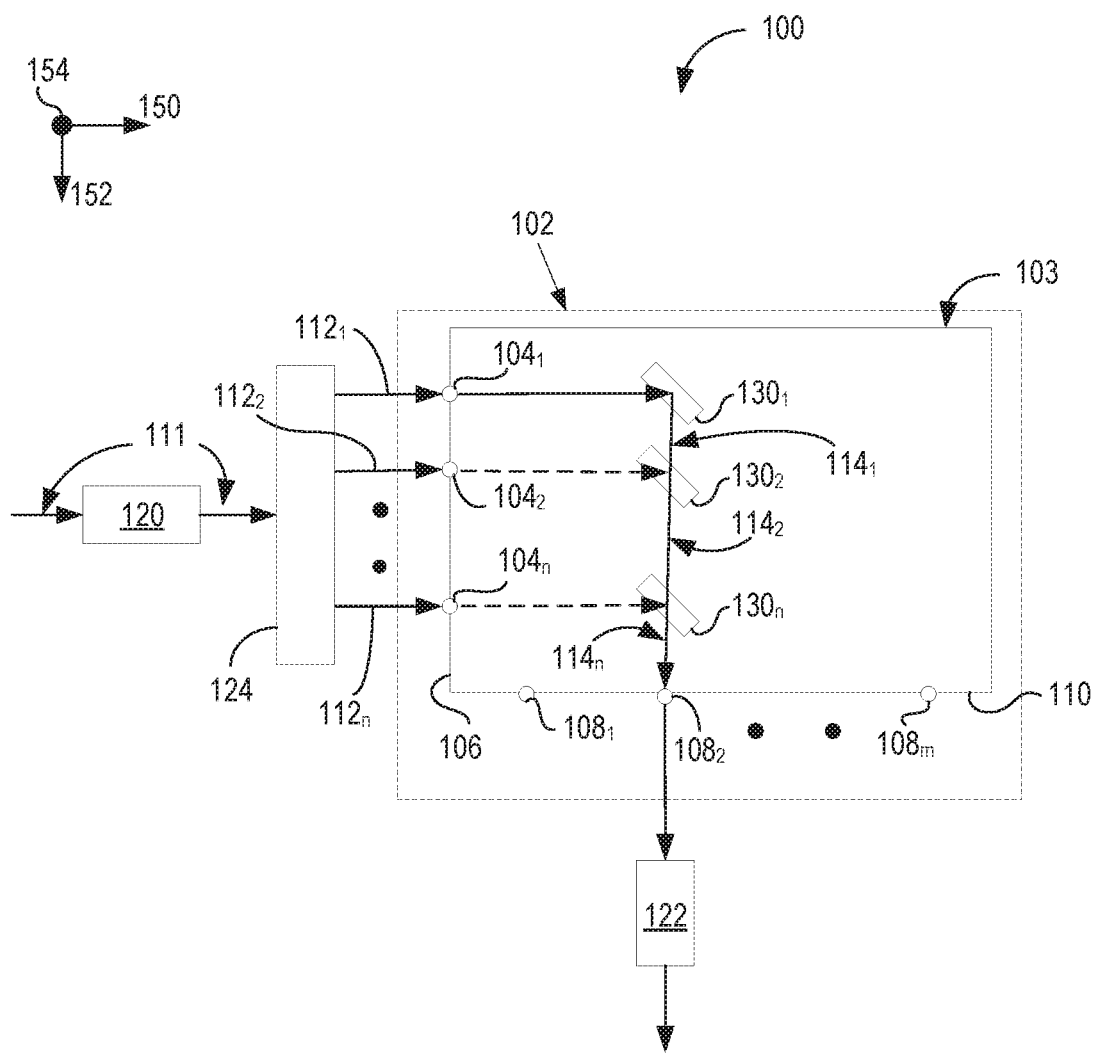
FIG. 1 schematically illustrates a system including an optical device for redirecting an optical signal, in an example.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "an," and "the" are intended to include the plural forms as well, unless the context clearly indicates otherwise. The term "plurality," as used herein, is defined as two as or more than two. The term "another," as used herein, is defined as at least a second or more. The term "coupled," as used herein, is defined as connected, whether directly without any intervening elements or indirectly with at least one intervening element, unless otherwise indicated. Two elements can be connected mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise.

The term "adjacent" may mean that a first element may be disposed in the proximity of a second element. In some examples, the first element may be coupled to the second element. The first and second elements may be disposed in same plane or different planes. In an example, the element may be disposed above or below another element. Spatially relative terms, such as "below", "above", "lower", "upper", "left" and "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" or "above" can encompass both an orientation of above and below. The device may be otherwise oriented (rotated 90° or at other orientations) and the spatially relative descriptors used herein interpreted accordingly.

In general, optical switching within data networks may be implemented either using an optical-electrical-optical conversion switch architecture (O/E/O switching) or with an optical switch architecture. In O/E/O switching, optical signals to be switched are first converted to an electrical signal using conventional electric crossbar circuit switching. Once switched, the electrical signals are converted back to and retransmitted as optical signals. In contrast, in optical switching architecture (e.g., without O/E/O switching), optical signals are switched as optical signals without a conversion to and from electrical signals. While O/E/O switching has certain advantages in terms of fabrication and implementation in conventional integrated circuit technology, using O/E/O switching is becoming less and less desirable due to increased signal path latency (due to data buffers and signal media conversions) and bandwidth limitations (due to limited data buffers) in comparison to optical switching without O/E/O switching. For example, an optical switch operating directly on optical signals eliminates a need for data buffers, associated data buffer management logic, and electrical signal conversion process, which may reduce complexity and further tends to preserve the bandwidth inherent in optical interconnects such as optical fiber cables. However, while highly desirable in many applications, optical switching often requires a difficult trade-off to be made between costs and performance.

Examples in accordance with the present subject matter described herein provide an optical device for example, an optical switch. Herein, the term 'optical switch' by definition generally refers to one or both of a device and a structure that operates directly on an optical signal without prior conversion of the optical signal into an electrical signal. In an example, the optical device may be an all-optical switch. In particular, the optical device may provide optical switching from an optical input (e.g., a first optical waveguide) to an optical output (e.g., a second optical waveguide). In some examples, the optical device may provide optical switching from one or more optical inputs to one or more optical outputs. The optical input and the optical output may be single-mode optical waveguide, multi-mode optical waveguide or free space.

As used herein, 'optical waveguide' by definition refers to an optical element in which a propagating optical signal is confined to and propagates within a volume of the optical element. The optical element may be in a form of a slab, sheet or strip of a material. For example, a slab optical waveguide or simply a 'slab waveguide' is a slab of material or 'slab layer' that supports a propagating optical signal within the slab layer, by definition herein. The optical waveguide may include, but is not limited to, glass or polymer optical fiber, a ridge-loaded optical waveguide, an inverted or reverse ridge-loaded optical waveguide, or a strip optical waveguide. According to various examples, the optical device may employ a single-mode optical waveguide that propagates a single spatial optical mode a single or multiple wavelengths. In some examples, the optical device may employ a multi-mode optical waveguide that propagates multiple spatial optical modes of a single or multiple wavelengths.

According to the aspects described herein, an optical device for redirecting (e.g., switching) a plurality of optical signals from a first direction to a second direction is described. The optical device may be an optical switch. The optical device may include a plurality of input ports, a plurality of optical blocks such that at least one optical block of the plurality of optical blocks aligned to each input port of the plurality of input ports, and a plurality of output ports. The plurality of input ports may direct a plurality of optical signals of selective wavelengths to a first direction. Each of the optical blocks may be movable to a plurality of positions to selectively redirect the respective optical signal of the plurality of signals from the first direction to a second direction to one or more output ports of the plurality of output ports. The plurality of output ports may receive the one or more optical signals redirected to the second direction. In some examples, each of the optical blocks may be movable to a reflective position of the plurality of positions to redirect the respective optical signal from the first direction to the second direction to an output port of the plurality of output ports and a transmissive position of the plurality of positions to allow the respective optical signal to transmit in the first direction. In some aspects, an actuator may be implemented to selectively move one or more optical blocks of the plurality of optical blocks.

As used here, the term "reflective position" may refer to a position of an optical block in the optical device where the optical block redirects an optical signal directed in a first direction to a second direction. In these examples, the optical block may exist in the path of the optical signal such that it reflects the optical signal to the second direction. Further, the optical block may be placed at a desired angle (e.g., 45° with the incident optical signal) and orientation to redirect the optical signal from the first direction to the second direction. The term "transmissive position", as used herein, may refer to a position of an optical block in the optical device where the optical block allows the optical signal to transmit in the first direction. The optical block may allow the optical signal to transmit in the first direction by either allowing the optical signal to pass through the optical block or the optical block may be away from the path of the optical signal.

In accordance with various examples, the optical device, as described herein, may redirect the optical signals received from a first direction to a second direction that is different from the first direction. In some examples, the second direction is substantially perpendicular to the first direction. As used herein, the term "substantially perpendicular" may mean that the angle between the first direction and the second direction may be in a range from 80° to 100°, and in some examples, from 85° to 95°.

FIG. 1 illustrates a block diagram of a system 100 that employs an optical device 102, e.g., an optical switch, according to an example of the present subject matter. The optical device 102 may redirect (or route) an optical signal e.g., an optical signal $112_1$ that is transmitted in a first direction 150 to a second direction 152. After being redirected, the optical signal e.g., the optical signal $112_1$ may be transmitted to the second direction 152 as a redirected optical signal e.g., a redirected optical signal $114_1$. Although FIG. 1 illustrates that the second direction 152 is substantially perpendicular to the first direction 150, the present subject matter is not limited to the illustrated example. For example, the first direction 150 may extend obliquely relative to the second direction 152.

Referring to FIG. 1, the system 100 may include an optical input 120 that may provide an optical signal e.g., the optical signal $112_1$ in the first direction 150 and an optical output 122 that may receive and transmit the redirected optical signal e.g., the redirected optical signal $114_1$ to the second direction 152. In described examples, the optical device 102 may include a crossbar optical circuit where the optical input 120 and the optical output 122 intersect at an angle (e.g., between 80° and 100°). The optical input 120 and the optical output 122 may include optical waveguides, for example. In some examples, the optical input 120 and the optical output 122 may interface with optical fibers or similar optical waveguides. In an example, the optical input 120, the optical output 122 or both the optical input 120 and the optical output 122 may include a single-mode waveguide, a multi-mode waveguide or free space.

In examples as illustrated in FIG. 1, the optical input 120 may be a multi-mode optical waveguide that transmits a multi-mode optical signal 111 having multiple wavelengths multiplexed, such as a wavelength-division multiplexed (WDM) multi-mode optical signal. In such examples, a data distributer 124, e.g., a demultiplexer may be placed between the optical input 120 and the optical device 102, to receive the multi-mode optical signal 111 from the optical input 120 and route the multi-mode optical signal 111 to a plurality of optical signals ($112_1$, $112_2$, ..., $112_n$) of selective (such as different) wavelengths, where n is number of optical signals of selective wavelengths. In an example, 'n' may range from 2 to 10. In a specific example, n=4. In an example, the plurality of optical signals ($112_1$, $112_2$, ... $112_n$) of selective wavelengths may be directed in the first direction 150 to the optical device 102. In some examples, each of the optical signals ($112_1$, $112_2$, ... $112_n$) may include a waveband that includes a set of optical signals of multiple wavelengths.

Figure 2:
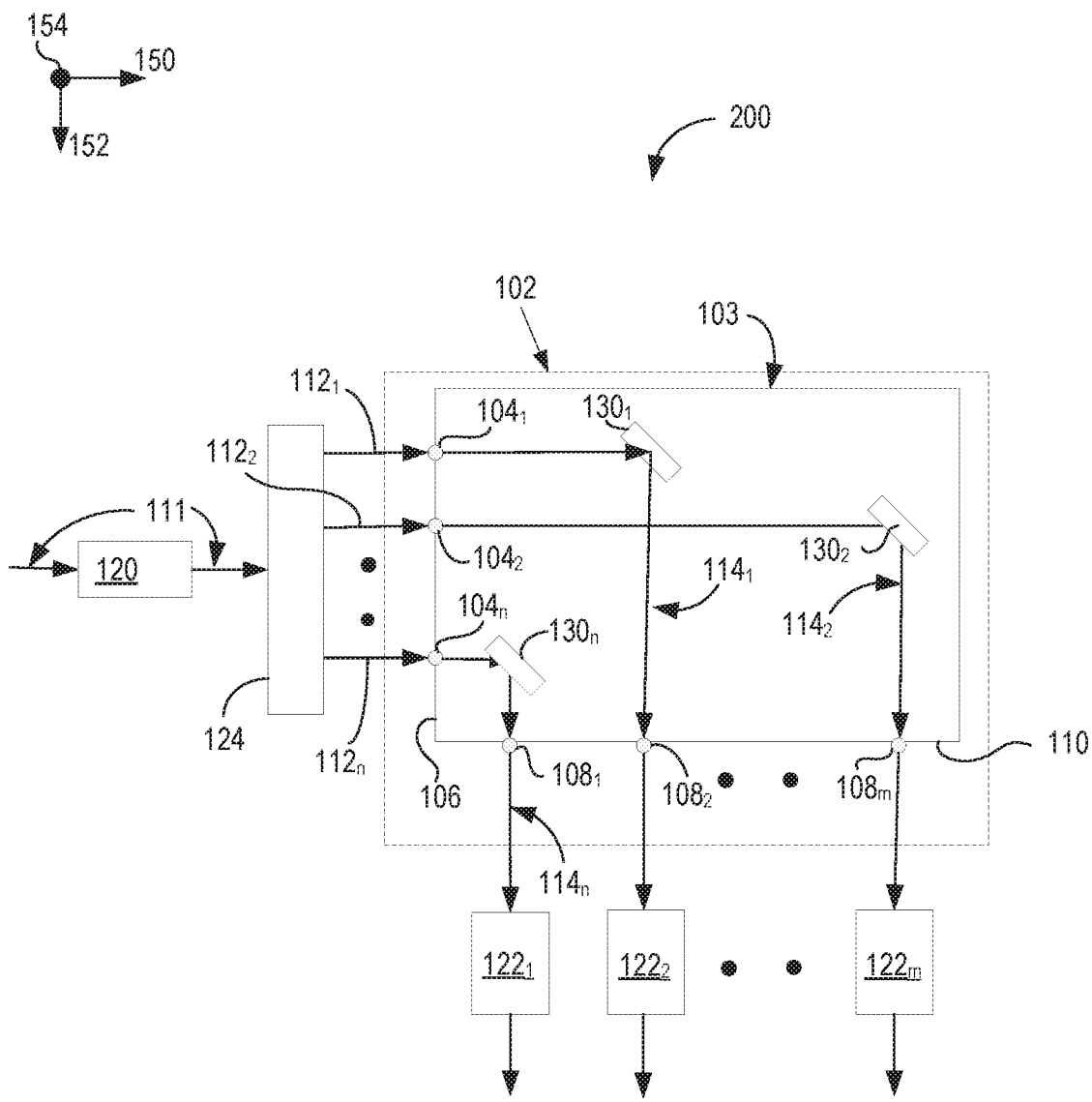
FIG. 2 schematically illustrates a system including an optical device for redirecting an optical signal, in another example.

The plurality of optical signals ($112_1$, $112_2$, ... $112_n$) may be, independently, redirected by the optical device 102 to the second direction 152 to be transmitted, as a plurality of redirected optical signals ($114_1$, $114_2$, ... $114_n$). In some examples, one or more optical signals of the plurality of optical signals ($112_1$, $112_2$, ... $112_n$) may be, selectively, redirected by the optical device 102 to the second direction 152 to be correspondingly transmitted as one or more redirected optical signals of the plurality of optical signals ($114_1$, $114_2$, ... $114_n$). The one or more redirected optical signals of the plurality of redirected optical signals ($114_1$, $114_2$, ... $114_n$) may be received by the optical output 122. In illustrated examples, a single optical output e.g., the optical output 122 may be utilized to receive one or more redirected optical signals of the plurality of redirected optical signals ($114_1$, $114_2$, ... $114_n$). In some examples, as shown in FIG. 2, a system 200 (similar to the system 100 of FIG. 1) may include a plurality of optical outputs ($122_1$, $122_2$, ... $122_m$) (where m is number of optical outputs) to selectively receive one or more redirected optical signals of the plurality of redirected optical signals ($114_1$, $114_2$, ... $114_n$). The number of optical outputs 'm' may be less than, equal to or greater than the number 'n' of optical signals of selective wavelengths. In an example, m may be equal to n.

A light source (not shown in Figures) could be implemented as laser with a center wavelengths covering a range of from about 990 nanometers (nm) to about 1065 nm, to provide the multi-mode optical signal 111 to the optical input 120. In some examples, various optical signals having different wavelengths may be combined (or multiplexed) to coexist in an optical fiber. Their center wavelengths may be separated by about 25 nm. In one example, a light source may be modulated by an electrical signal to generate an optical signal (or optical data signal) at 28 Gbps. In other examples, a light source may be modulated at higher data rates, such as 56 Gbps, 112 Gbps, etc. In one example, the light source could be implemented as a vertical-cavity surface-emitting laser (VCSEL) e.g., a single-mode or multi-mode VCSEL. A VCSEL is a type of semiconductor laser diode with laser beam emission perpendicular from its top or bottom surface to directly module an electrical signal. In other examples, other light sources could be employed such as edge emitting lasers. The modulated output of the optical signal can be controlled by a laser driver that can in turn be driven by a controller. The controller can be implemented, e.g., as a network interface controller (NIC), a switch, a micro-processor, a gate array, or the like. The controller may be a part of a computer system. An optical receiver (not shown in Figures) may be implemented for example, as a photodetector to receive one or more redirected optical signals of the plurality of redirected optical signals ($114_1$, $114_2$, ... $114_n$) from the optical device 102 via the optical output 122 (FIG. 1) or one or more optical output of the plurality of optical outputs ($122_1$, $122_2$, ... $122_m$) (FIG. 2). In some examples, the optical receiver may convert a redirected optical signal e.g., the optical signal $114_1$ into an electrical signal which could be provided to a computer system.

Referring to FIGS. 1-2, in the illustrated examples, the optical device 102 may include a housing 103 having a volume. In an example, the housing 103 may have a rectangular cross sectional area. The housing 103 may include a plurality of input ports ($104_1$, $104_2$, ... $104_n$) on a first wall 106 and a plurality of output ports ($108_1$, $108_2$, ... $108_m$) (the number of output ports may be equal to the number of optical outputs 'm') on a second wall 110 adjacent to the first wall 106. In the illustrated example, the second wall 110 may be substantially perpendicular to the first wall 106. According to various examples, the optical device 102 may receive one or more optical signals of the plurality of optical signals ($112_1$, $112_2$, ... $112_n$), at the corresponding input ports ($104_1$, $104_2$, ... $104_n$) that direct the respective optical signals in the first direction 150 inside the housing 102. In an example, each input port of the plurality of input ports ($104_1$, $104_2$, ... $104_n$) may receive a respective optical signal of a selective wavelength of the plurality of optical signals ($112_1$, $112_2$, ... $112_n$) and direct the respective optical signal to the first direction 150 inside the housing 103. In some examples, each of the input ports ($104_1$, $104_2$, ... $104_n$) may receive and direct the respective optical signal of different wavelength. In some examples, each of input ports ($104_1$, $104_2$, ... $104_n$) may include a lens (not shown in Figures). In some examples, the input ports of the plurality of input ports ($104_1$, $104_2$, ... $104_n$) may receive collimated beams of optical signals. In such examples, collimating lenses may be positioned at or adjacent respective input ports in the path of each of the optical signals ($112_1$, $112_2$, ... $112_n$) to receive collimated beams of the optical signals at each of the input ports ($104_1$, $104_2$, ... $104_n$). A collimated beam of light has parallel rays, and therefore may spread minimally as it propagates. A perfectly collimated light beam, with no divergence, may not disperse with distance.

In the illustrated examples, the optical device 102 may redirect one or more optical signals of the plurality of optical signals ($112_1$, $112_2$, ... $112_n$) directed in the first direction 150, to the second direction 152. One or more output ports of the plurality of output ports ($108_1$, $108_2$, ... $108_m$) may receive and direct the respective redirected optical signal(s) ($114_1$, $114_2$, ... $114_n$) to the optical output 122 (FIG. 1) or one or more optical outputs of the plurality of optical outputs ($122_1$, $122_2$, ... $122_m$) (FIG. 2) in the second direction 152, as described in further detail below. In some examples, each of the output ports ($108_1$, $108_2$, ... $108_m$) may include a lens (not shown in FIG. 1). In some examples, a lens may be positioned at or adjacent each of the output ports ($108_1$, $108_2$, ... $108_m$) in the path of the redirected optical signal(s) ($114_1$, $114_2$, ... $114_n$) to focus a collimated light beam into one or more optical outputs of the plurality of optical outputs ($122_1$, $122_2$, ... $122_m$). In one example, each of the optical outputs ($122_1$, $122_2$, ... $122_m$) may be an optical fiber.

As described, each of the optical signals ($112_1$, $112_2$, ... $112_n$) of selective wavelengths may be directed in the first direction 150 to the corresponding respective input ports of the plurality of input ports ($104_1$, $104_2$, ... $104_n$). One or more optical signals of the plurality of optical signals ($112_1$, $112_2$, ... $112_n$) may be redirected by the optical device 102 to the second direction 152 in form of corresponding one or more redirected optical signals of the plurality of redirected optical signals ($114_1$, $114_2$, ... $114_n$). The one or more redirected optical signals of the plurality of output signals ($114_1$, $114_2$, ... $114_n$) may be received by one or more optical outputs of the plurality of optical outputs ($122_1$, $122_2$, ... $122_m$) (FIG. 2) via the respective output ports of the plurality of optical ports ($108_1$, $108_2$, ... $108_m$).

In the illustrated examples, the optical device 102 may include a plurality of optical blocks e.g., 'n' number of optical blocks ($130_1$, $130_2$, ... $130_n$). The plurality of optical blocks ($130_1$, $130_2$, ... $130_n$) may be disposed on a substrate within the housing 103 and arranged such that at least one optical block of the plurality of optical blocks ($130_1$, $130_2$, ... $130_n$) is aligned to each input port of the plurality of input ports ($104_1$, $104_2$, ... $104_n$). For example, as illustrated, the optical block $130_1$ may be aligned to an input port $104_1$ and the optical block $130_2$ may be aligned to another input port $104_2$. In the examples described herein, each of the optical blocks ($130_1$, $130_2$, ... $130_n$) may be movable, independently, to a plurality of positions to selectively redirect the respective optical signal of the plurality of optical signals ($112_1$, $112_2$, ... $112_n$) directed in the first direction 150 to the second direction 152. In some examples, each of the optical blocks ($130_1$, $130_2$, ... $130_n$) may be movable to a reflective position to redirect the respective optical signal of selective wavelength of the plurality of optical signals ($112_1$, $112_2$, ... $112_n$) to the second direction 152 and a transmissive position to allow the respective optical signal to transmit in the first direction 150. In some examples, each of the optical blocks ($130_1$, $130_2$, ... $130_n$) may redirect the respective optical signal of different wavelength. For example, the optical block 130a may redirect an optical signal of a wavelength $\lambda_1$ (such as centered at about 990 nm), the optical block 130b may redirect an optical signal of another wavelength $\lambda_2$ (such as centered at about 1015 nm), and so on. In examples where an optical signal e.g., $112_1$ includes a waveband including a set of multiple wavelengths, the respective optical block e.g., $130_1$ may redirect the multiple wavelengths in the set of the waveband.

Furthermore, each of the optical blocks ($130_1$, $130_2$, ... $130_n$) may be positioned at an angle with respect to the first direction 150 such that an optical signal e.g., the optical signal $112_1$ directed to the first direction 150 may be redirected to a desired direction. Further, in an example, each of the optical blocks ($130_1$, $130_2$, ... $130_n$), in their respective reflective position, may be positioned (at 45° with the first direction) such that the respective optical signal of the plurality of optical signals ($112_1$, $112_2$, ... $112_n$) transmitted in the first direction 150, may be redirected to the second direction 152 (that is substantially perpendicular to the first direction 150).

Figure 3:
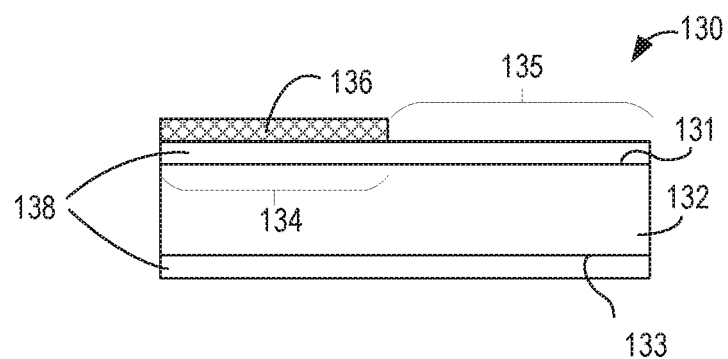
FIG. 3 illustrates an example of an optical block.

As used here, the term "optical block" may refer to a block that may redirect an optical signal of a wavelength from a first direction to a second direction. The optical block may include a reflective portion that redirects an optical signal by reflecting the optical signal. In an example, the reflective portion may include a mirror. The mirror may be a semi-transparent mirror, for example. In another example, the reflective portion may include an optical filter. In some examples, the optical block may further include a transmit portion that may allow an optical signal to pass through. FIG. 3 shows an example optical block 130. The optical block 130 may include a block (or a substrate) 132 having a reflection portion 134. The block 132 may be a substantially transparent block of a material such as glass having flat surfaces. The term "substantially transparent block" may mean that the block may allow substantially all optical signals to pass through. In an example, an optical layer 136 may be disposed on at least a portion of a surface 131 of the block 132 to form the reflection portion 134. In an example, the optical layer 136 may include an optical filter e.g., a bandpass filter. The remaining portion of the block 132 (that may not be covered by the optical filter 136) may be a transmit portion 135 that may allow substantially all optical signals to pass through. As used herein, the term "substantially all optical signals" may mean that the transmit portion 135 may allow all the optical signals received from the optical input 120 to pass through.

In an example, the optical layer 136 may be disposed on a portion of a surface 131 of the block 132. In some examples, the surface 131 of the optical block 132 may be fully covered by the optical layer 136. In these examples, the optical block 132 may not include a transmit portion. The optical layer 136 may include a single optical coating or a plurality of optical coatings that may be designed to reflect a selective wavelength or a set of multiple wavelengths (i.e., a waveband) and transmit other wavelengths. In order to form such optical layer 136, the coating or the plurality of coatings may be composed of one or more materials and of precise thicknesses. In some examples, an anti-reflection coating 138 may be disposed on the surface 131 and another surface 133 (opposite to the surface 131) of the block 132. In such examples, the antireflection coating 138 disposed on the surface 131 may be present between the block 132 and the optical layer 136. In other examples, the antireflection coating 138 may not be present between the optical layer 136 and the surface 131.

In some examples, an actuator may be utilized to selectively move one or more optical blocks of the plurality of optical blocks ($130_1$, $130_2$, ... $130_n$) to various positions of the plurality of positions. A variety of actuators may be used for the purpose, for example, mechanical, electric, piezoelectric and the like. In some examples, a plurality of actuators may be placed adjacent to one or more optical blocks of the plurality of optical blocks ($130_1$, $130_2$, ... $130_n$) to move each of the optical blocks, selectively, to the one or more positions. In an example, the actuator may be rotatable about its axis. In an example, the actuator may be movable in a linear direction.

In an example, each of the optical blocks ($130_1$, $130_2$, ... $130_n$) may be movable along a third direction 154 that is substantially perpendicular to the first direction 150 and the second direction 152. Referring to FIGS. 1 and 2, in some examples, each of the optical blocks ($130_1$, $130_2$, ... $130_n$) may be movable to a first position and a second position along the third direction 154. The first position for each of the optical blocks may be a reflective position of the respective optical block, and the second position may be a transmissive position of the respective optical block. Each of the optical blocks ($130_1$, $130_2$, ... $130_n$), in their respective second positions, may be aligned to the respective input port of the plurality of input ports ($104_1$, $104_2$, ... $104_n$)

At the respective first position (i.e., reflective position), each of the optical blocks ($130_1$, $130_2$, ... $130_n$) may, individually, redirect the respective optical signal of the plurality of optical signals ($112_1$, $112_2$, ... $112_n$) directed in the first direction 150 to the second direction 152 (that is substantially perpendicular to the first direction 150). At the respective second position (i.e., transmissive position), each of the optical blocks ($130_1$, $130_2$, ... $130_n$) may allow the respective optical signal to transmit in the first direction 150. For example, at the first position, an optical block e.g., the optical block $130_1$ may be present in path of the respective optical signal $112_1$ such that the optical signal $112_1$ incidents on the reflection portion (e.g., the reflection portion 136 of the example optical block 130 in FIG. 3) of the optical block $130_1$, that redirects the optical signal $112_1$ in the second direction 152. At the second position, the optical block $130_1$ may be present in path of the respective optical signal $112_1$ such that the optical signal $112_1$ incidents on the transmit portion (e.g., the transmit portion 135 of the example optical block 130 in FIG. 3) of the optical block $130_1$, that allows the optical signal $112_1$ to transmit (by passing it through) in the first direction 150.

Figure 4:
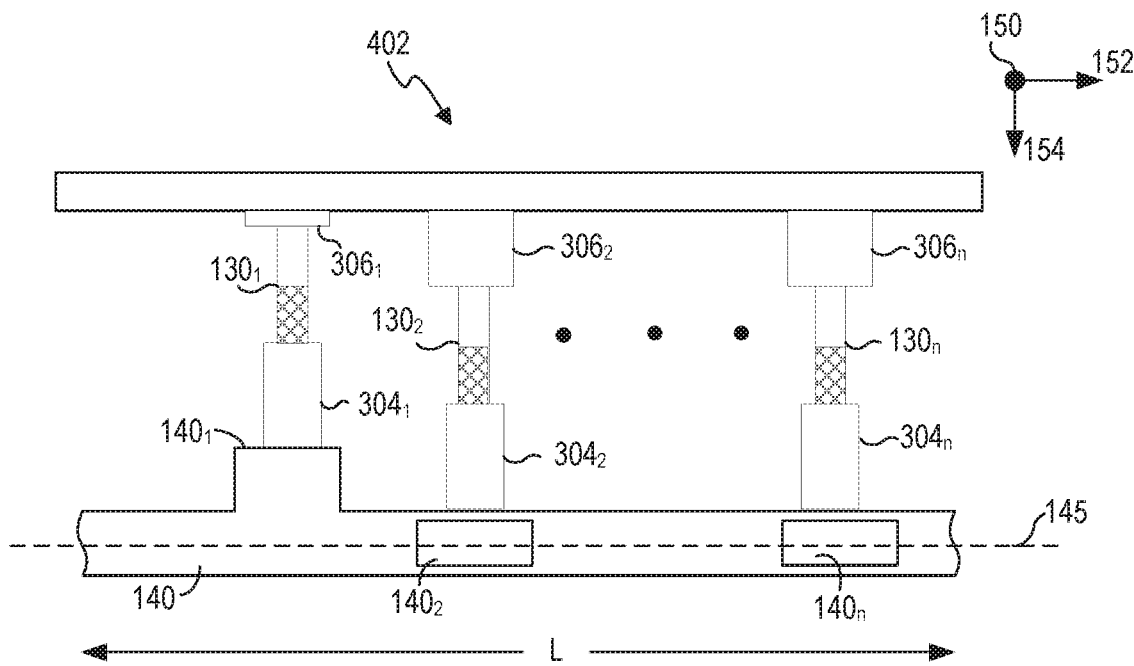
FIG. 4 illustrates cross-sectional view of an optical device including an actuator, in an example.

FIG. 4 illustrates a schematic cross-sectional view of an optical device 402 (similar to the optical device 102 of FIG. 1), where the optical blocks of the plurality of optical blocks ($130_1$, $130_2$, ... $130_n$) may be positioned in a column along the second direction 152. In these examples, each of the optical blocks ($130_1$, $130_2$, ... $130_n$) may be movable to the first position and the second position along the third direction 154, using an actuator e.g., a camshaft 140. The camshaft 140 may be positioned below the optical blocks of the plurality of optical blocks ($130_1$, $130_2$, ... $130_n$) positioned, extending along the second direction 152 to move, selectively, each of the optical blocks ($130_1$, $130_2$, ... $130_n$). The camshaft 140 may have multiple protrusions ($140_1$, $140_2$, ... $140_n$) at different surfaces of the camshaft along a length 'L' of the camshaft 140. FIG. 4 shows the protrusions ($140_1$, $140_2$, ... $140_n$) of rectangular shape for simplicity, however the protrusions ($140_1$, $140_2$, ... $140_n$) may be of any shape and size, such as a trapezoid or hemisphere, to achieve the purpose, as understood to a person skilled in the art. In an example, a number of protrusions in the camshaft 140 may be equal to the number of optical blocks ($130_1$, $130_2$, ... $130_n$). Each of the optical blocks ($130_1$, $130_2$, ... $130_n$) may be placed vertically along the third direction 154 on a base structure of a plurality of base structures ($304_1$, $304_2$, ... $304_n$) such that each of the optical blocks ($130_1$, $130_2$, ... $130_n$) may move to the first position and the second position. In some examples, as illustrated, the plurality of base structures ($304_1$, $304_2$, ... $304_n$) may be used between the actuator 140 and the plurality of optical blocks ($130_1$, $130_2$, ... $130_n$) to support each of the optical blocks ($130_1$, $130_2$, ... $130_n$). Further, a plurality of biasing elements ($306_1$, $306_2$, ... $306_n$) e.g., springs may be used above each of the optical blocks ($130_1$, $130_2$, ... $130_n$) to allow the respective optical blocks to move to the first position and the second position along the third direction 154.

By rotating the camshaft 140 about its axis 145, one of the optical blocks ($130_1$, $130_2$, ... $130_n$), e.g., the optical block 130a may be moved up to the first position by pushing it up by the protrusion $140_1$. In these instances, the reflective portion (e.g., the reflective portion 136 of the optical block 130 as shown in FIG. 3) of the optical block 130a may be in path of the optical signal $112_1$ directed by the respective input port $104_1$ in the first direction 150. The optical signal $112_1$ may be redirected by the reflection portion of the optical block 130a in the second direction 152 (FIGS. 1, 3 and 4). In these instances, other optical blocks e.g., $130_2$, ... $130_n$ except $130_1$ may be at their second positions and the reflection portions (similar to the reflection portion 136 of the optical block 130 as shown in FIG. 3) of the optical blocks ($130_2$, ... $130_n$) may be away from the path of the respective optical signals $112_2$, ... $112_n$. In these examples, the optical blocks ($130_2$, ... $130_n$) except $130_1$ may allow the respective optical signals $112_2$, ... $112_n$ to pass through their respective transmit portions (similar to the transmit portion 135 of the optical block 130 as shown in FIG. 3).

Referring to FIGS. 1 and 4, one optical block of the plurality of blocks (($130_1$, $130_2$, ... $130_n$) may be moved to the first position, at a time, to redirect a desired optical signal to the second direction 152 towards the optical output 122. Referring to FIGS. 2 and 4, multiple actuators may be used to move one or more optical blocks of the plurality of optical blocks ($130_1$, $130_2$, ... $130_n$) to their respective first position (i.e., reflective position) and the second position (i.e., transmissive position) to selectively redirect one or more optical signals of the plurality of optical signals ($112_1$, $112_2$, ... $112_n$) to an optical output of the plurality of optical outputs ($122_1$, $122_2$, ... $122_m$).

In some other examples, an actuator e.g., a screw may be used below each of the optical blocks ($130_1$, $130_2$, ... $130_n$), in the examples shown in FIG. 1 and FIG. 2. By using the screws, each of the optical blocks ($130_1$, $130_2$, ... $130_n$) may be, independently, moved along the third direction 154 (e.g., up and down) to the first position and the second position.

In an example, each of the optical blocks ($130_1$, $130_2$, ... $130_n$) may be movable along a linear direction e.g., the first direction 150. In these examples, each of the optical blocks ($130_1$, $130_2$, ... $130_n$) may be movable to multiple reflective positions along the first direction 150 to selectively redirect the optical signals of the plurality of optical signals ($112_1$, $112_2$, ... $112_n$) to the second direction towards a desired optical output of the plurality of optical outputs ($122_1$, $122_2$, ... $122_m$). In an example, each of the optical blocks ($130_1$, $130_2$, ... $130_n$) may be movable in a rotational direction about the first direction 150. In an example, an actuator may be used to selectively move the optical blocks of the plurality of optical blocks ($130_1$, $130_2$, ... $130_n$).

Figure 5:
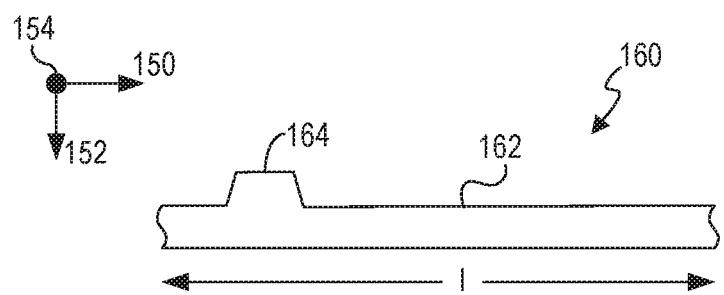
FIG. 5 schematically illustrates an example actuator.

FIG. 5 shows an example actuator 160. In these examples, the actuator 160 may include a rod 162 of length 'l' with a protrusion 164, as shown in FIG. 5. The rod 162 may have a cross section of any shape e.g., a polygon, circle, oval or the like. FIG. 5 shows the protrusion 164 of trapezoidal shape. However, the protrusion 164 may be of any shape and size to achieve the purpose, as understood to a person skilled in the art. The actuator 160 may be movable in a linear direction. In some examples, an actuator e.g., the actuator 160 may be implemented adjacent (e.g., below) to each of the optical blocks ($130_1$, $130_2$, ... $130_n$), extending along the second direction 152. In these examples, the actuator 160 may be movable in the second direction 152. For example, the actuator 160 may be implemented in place of the actuator 140 in the optical device 402 as shown in FIG. 4. By moving the actuator 160 along the second direction 152, the optical blocks ($130_1$, $130_2$, ... $130_n$) may be selectively moved to the first position (i.e., the reflective position) and the second position (i.e., the transmissive position) along the third direction 154.

Figure 6:
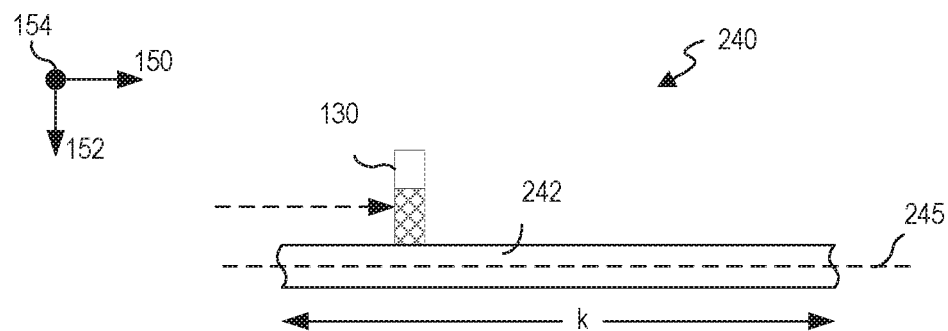
FIG. 6 schematically illustrates another example actuator.

FIG. 6 shows an example actuator 240. The actuator 240 may include a rod 242 of length 'k'. The rod 242 may have a cross section of any shape e.g., a polygon, circle, oval or the like. In such examples, an optical block (e.g., the optical block 130 may be coupled at a predefined distance from an end of the rod 242 at a desired angle and orientation. FIG. 6 shows the optical block 130 being coupled at an angle about 90° to the rod 242, for simplicity. However, it may be understood that the optical block 130 may be coupled to the rod 242 at any angle to the rod 242. In an example, the actuator 240 may be movable in a rotational direction about its axis 245. In some examples, the actuator 240 may be movable in a linear direction e.g., along the axis 245. In some other examples, the actuator 240 may include multiple optical blocks positioned along the radial positions at different predefined distances from an end of the rod 242.

Figure 7:
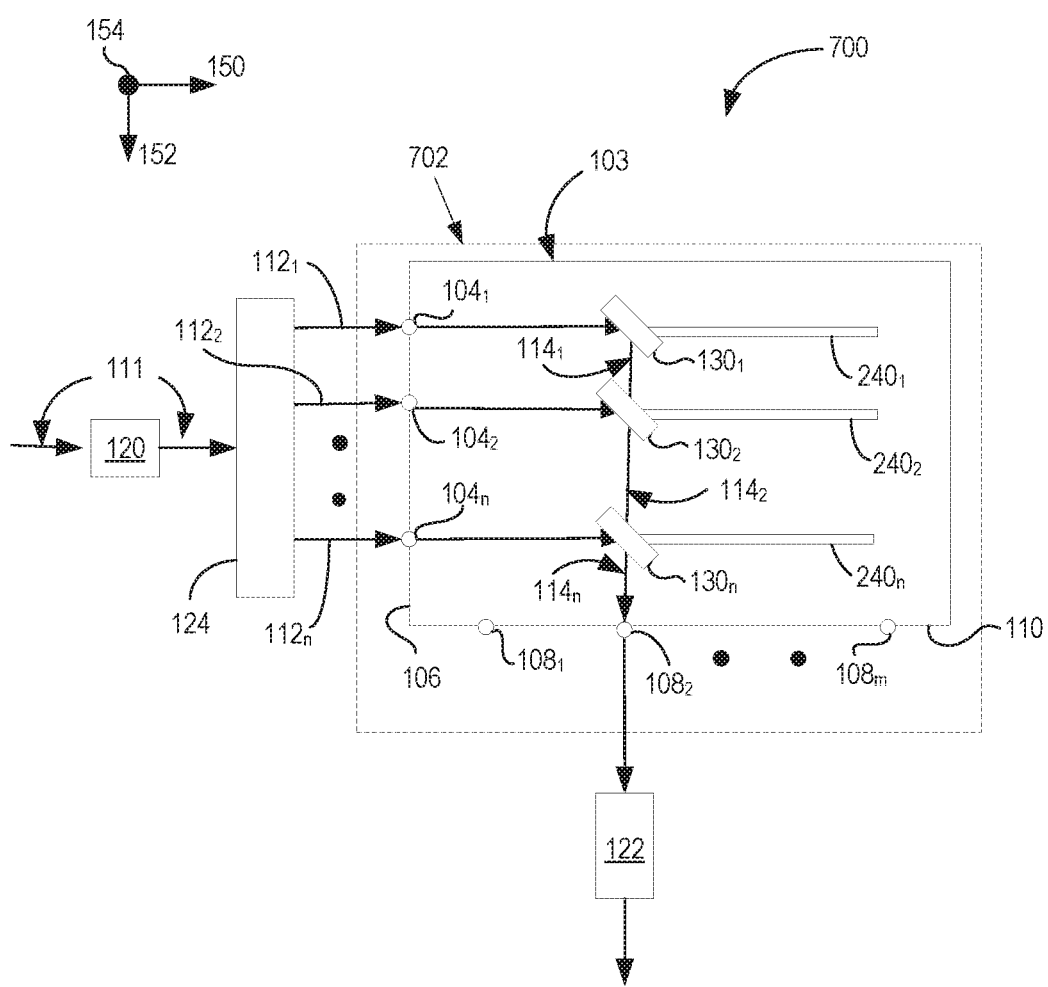
FIG. 7 schematically illustrates a system including an optical device, in yet another example.

A plurality of actuators similar to the actuator 240 as described and illustrated with respect to FIG. 6, may be utilized in the systems 100 and 200 of FIGS. 1 and 2. FIG. 7 schematically illustrates such an example system 700 that includes an example optical device 702 (similar to the optical device 102 of FIGS. 1 and 2) that includes a plurality of actuators ($240_1$, $240_2$, ... $240_n$) where each of the actuators may include respective optical block ($130_1$, $130_2$, ... $130_n$).

In some examples, each of the actuators ($240_1$, $240_2$, ... $240_n$) may be movable in the rotational direction about its respective axis (similar to the axis 245 in FIG. 6) to move the respective optical block ($130_1$, $130_2$, ... $130_n$) to a reflective position i.e., in the path of the respective optical signals ($112_1$, $112_2$, ... $112_n$) and a transmissive position i.e., away from the path of each of the respective optical signals ($112_1$, $112_2$, ... $112_n$). In these examples, each of the optical blocks ($130_1$, $130_2$, ... $130_n$) may be, independently, moved to the reflective position by rotating the respective actuator ($240_1$, $240_2$, ... $240_n$) about its axis. In such examples, the respective optical signal of the plurality of optical signals ($112_1$, $112_2$, ... $112_n$) may incident on the reflection portion (similar to the reflection portion 136 (FIG. 3)) of the respective optical block ($130_1$, $130_2$, ... $130_n$) and be redirected to a desired direction e.g., the second direction 152. In some examples, each of the optical blocks ($130_1$, $130_2$, ... $130_n$) may be, independently, moved to the transmissive position (i.e., away from the path of the optical signal) to allow the respective optical signals ($112_1$, $112_2, \ldots 112_n$) o transmit in the first direction 150. By using such actuators ($240_1, 240_2, \ldots 240_n$), the optical blocks ($130_1, 130_2, \ldots 130_n$) may be selectively positioned (by rotating the actuators) to redirect one or more optical signals of the plurality of optical signals ($112_1, 112_2, \ldots 112_n$) of selective wavelengths in the second direction 152 to the optical output 122.

In some examples, each of the optical blocks ($130_1, 130_2, \ldots 130_n$) may be coupled at a predefined distance from an end of each of the respective actuators ($240_1, 240_2, \ldots 240_n$) at a desired angle and orientation. The predefined distance may be different for each of the actuators ($240_1, 240_2, \ldots 240_n$) depending on desired position of the respective optical blocks to redirect the respective optical signal to one or more desired optical outputs of the plurality of optical outputs ($122_1, 122_2, \ldots 122_m$) through output ports of the plurality of output ports ($108_1, 108_2, \ldots 108_m$) in FIG. 7.

In examples where the actuator 240 includes multiple optical blocks for example, the plurality of optical blocks ($130_1, 130_2, \ldots 130_n$), each of the optical blocks ($130_1, 130_2, \ldots 130_n$) may be positioned radially at different predefined distances from an end of the rod 242. Such actuator 240 may be movable in a rotational direction about its axis 245. Referring to FIG. 1, such actuator 240 may be placed along the second direction 152, aligning the optical output 122. By rotating the actuator 140 about its axis 245, an optical block e.g., the optical block $130_1$ may be positioned at the reflective position i.e., in the path of the respective optical signal $112_1$ to redirect the optical signal $112_1$ towards the optical output 122 through the output port 108 while other optical blocks may exist in their transmissive position.

Figure 8:
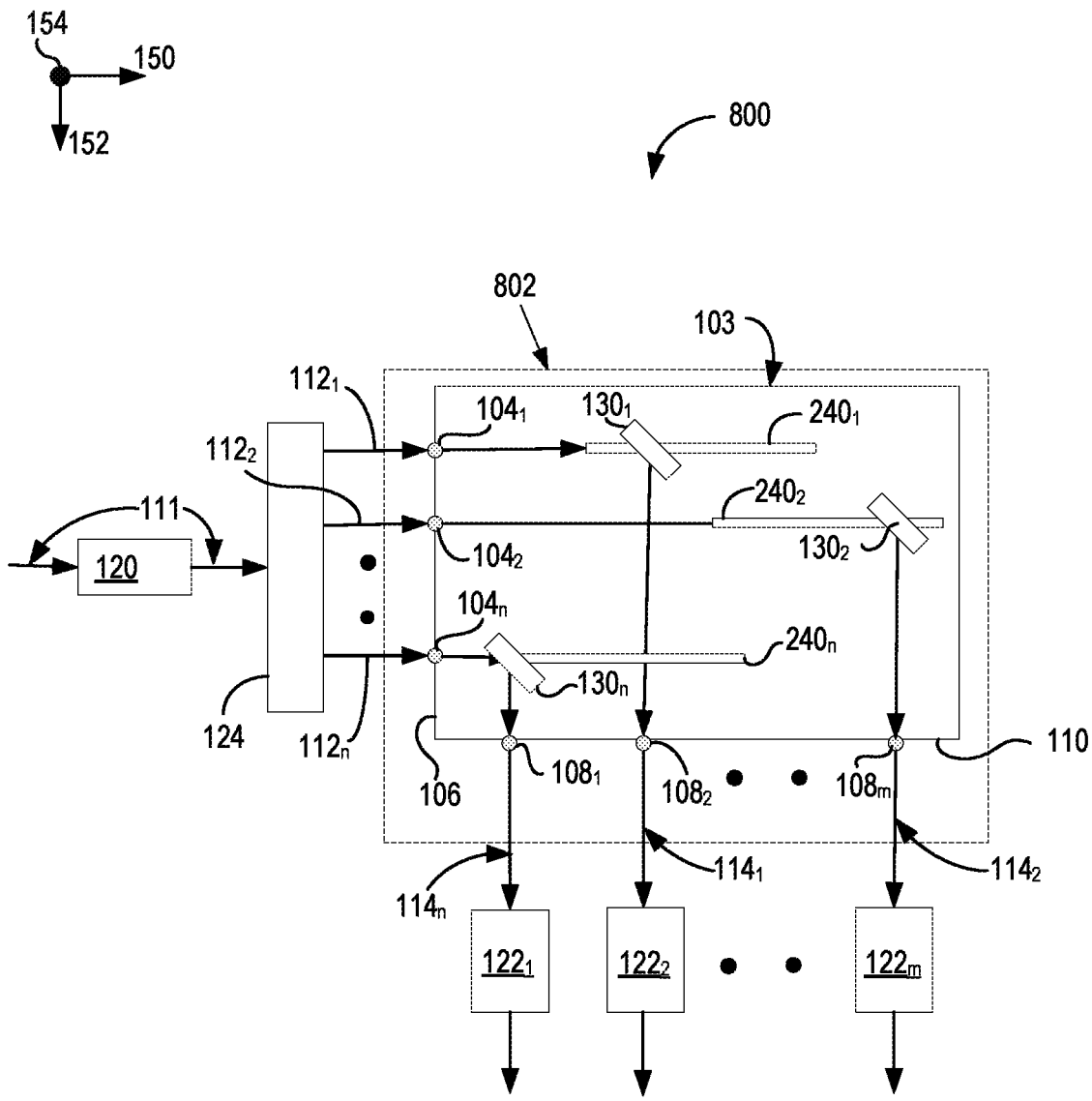
FIG. 8 schematically illustrates a system including an optical device, in yet another example.

In some examples, each of the actuators ($240_1, 240_2, \ldots 240_n$) may be movable in a linear direction. Each of the optical blocks ($130_1, 130_2, \ldots 130_n$) may be movable to multiple reflective positions in a linear direction e.g., the first direction 150, to redirect an optical signal e.g., the optical signal $112_1$ towards any desired output port. FIG. 8 schematically illustrates an example system 800 that includes an example optical device 802 (similar to the optical device 102 of FIGS. 1 and 2) where each of the actuators ($240_1, 240_2, \ldots 240_n$) may be movable in the first direction 150. In some of these examples, each of the actuators ($240_1, 240_2, \ldots 240_n$) may be moved along the first direction 150 to place the respective optical block of the optical blocks ($130_1, 130_2, \ldots 130_n$) at desired positions to redirect the respective optical signals ($112_1, 112_2, \ldots 112_n$) to the one or more optical outputs of the plurality of optical outputs ($122_1, 122_2, \ldots 122_m$). For example, by placing each of the optical blocks ($130_1, 130_2, \ldots 130_n$) at desired positions, the respective optical signals ($112_1, 112_2, \ldots 112_n$) of selective wavelengths may be, selectively, redirected to different optical outputs of the plurality of optical outputs ($122_1, 122_2, \ldots 122_m$) aligned to the respective output port of the plurality of output ports ($108_1, 108_2, \ldots 108_m$), as shown in FIG. 8. Any combination of above examples (as described herein) may also be used for desired propagation of optical signals from the optical input 120 to one or more of the optical outputs ($122_1, 122_2, \ldots 122_m$).

Figure 9:
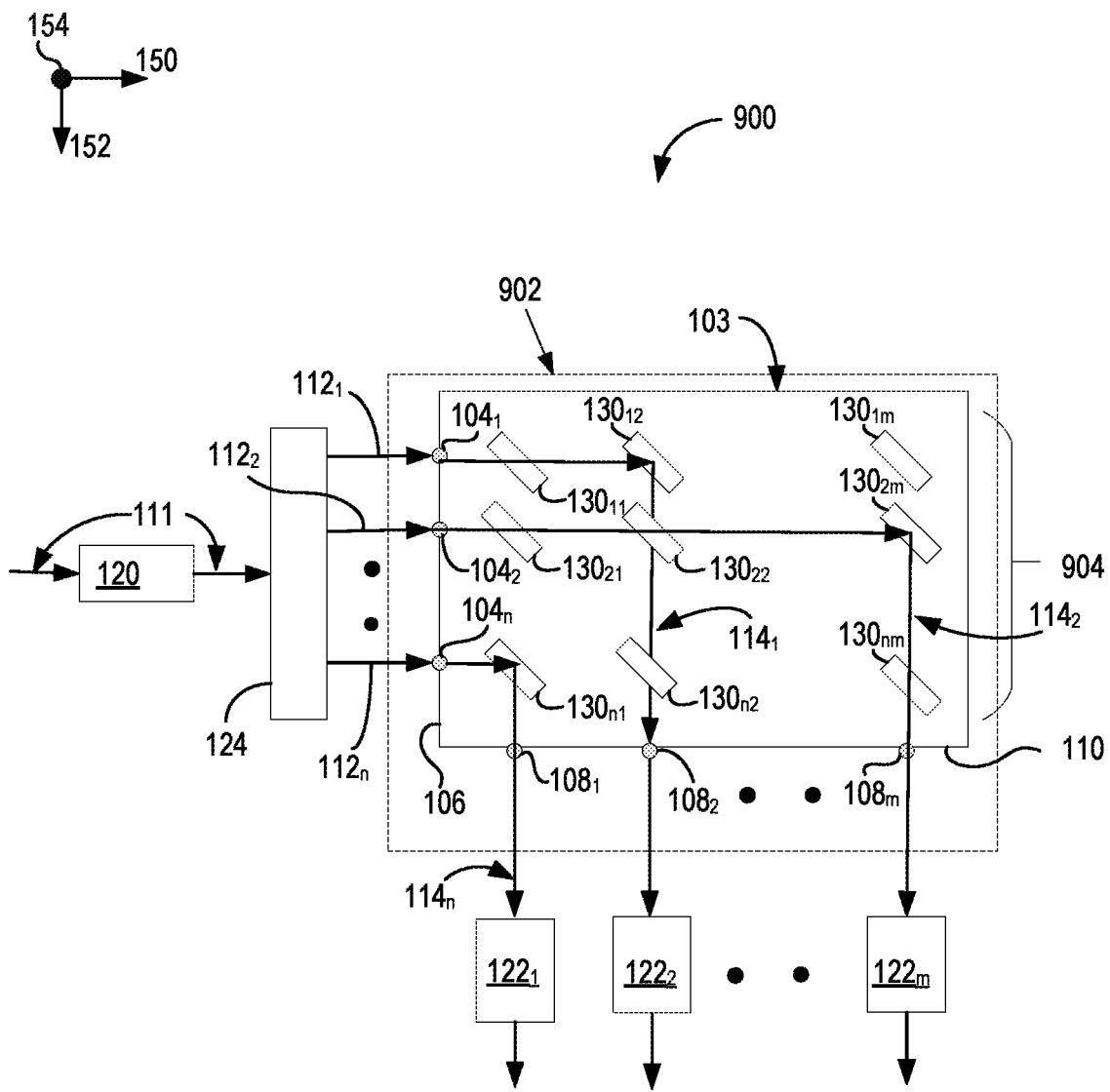
FIG. 9 schematically illustrates a system including an optical device, in yet another example.

In some examples, a system 900 may include an optical device 902 including a plurality of optical blocks in an array 904 as shown in FIG. 9. The optical device 902 may be similar to the optical device 102 except that the optical device 902 includes the array 904 of optical blocks. The array 904 may include a plurality of rows and a plurality of columns. In illustrated example, the array 904 may include 'n' rows of optical blocks and 'm' columns of the optical blocks. Each row of the plurality of rows may be aligned to an input port of the plurality of input ports ($104_1, 104_2, \ldots 104_n$) and each column of the plurality of columns may be aligned to an output ports of the plurality of output ports ($108_1, 108_2, \ldots 108_m$). For example, a first row may include a first row of two or more 'm' optical blocks ($130_{11}, \ldots 130_{1m}$) where m≥2 (e.g., 2, 4, 8, 12, 16, 20), a second row may include a second row of two or more 'm' optical blocks ($130_{21}, \ldots 130_{2m}$) where m≥2 (e.g., 2, 4, 8, 12, 16, 20), and an "$n^{th}$" (e.g., third) row may include an "$n^{th}$" (e.g., third) row of two or more 'm' optical blocks ($130_{n1}, \ldots 130_{nm}$) where m≥2 (e.g., 2, 4, 8, 12, 16, 20). Each optical block in a row of the plurality of rows may redirect an optical signal of same wavelength. Each optical block in a column of the plurality of columns may redirect an optical signal of different wavelength.

In these examples, any kind of actuators as described in above examples may be implemented in the system 900 to move each of the optical blocks ($130_{11}, \ldots, 130_{21}, \ldots 130_{nm}$) of the array in the reflective position and the transmissive position to selectively redirect one or more optical signals of the plurality of optical signals ($112_1, 112_2, \ldots 112_n$). The actuators, as described in various examples herein, may be positioned along the first direction 150, the second direction 152 or the third direction 154 to move each of the optical blocks ($130_{11}, \ldots, 130_{21}, \ldots 130_{nm}$) in the reflective position and the transmissive position, as desired. In some examples, a plurality of actuators (not shown in FIG. 9), each similar to the camshaft 140 as shown in FIG. 4 may be implemented below each column (i.e., extending along the second direction 152) of the plurality of columns of the optical blocks in the array 904. In such examples, an optical block in each column of the array 904 may be movable to the reflective position to redirect the respective optical signal ($112_1, 112_2, \ldots 112_n$) directed in the first direction 150 to the second direction 152 and the transmissive position to allow the respective optical signal ($112_1, 112_2, \ldots 112_n$) to transmit in the first direction 150 (as discussed with respect to FIG. 4). In some other examples, the plurality of actuators may be implemented, one actuator below each of the rows (i.e., extending along the first direction 150) of the array 704. In such examples, by rotating the actuators about their axis (e.g., rotating camshaft 140 about the axis 145), the respective optical blocks ($130_{11}, \ldots, 130_{21}, \ldots 130_{nm}$) in the array 904 may be selectively moved to the reflective position and the transmissive position. As shown in FIG. 9, at least one optical block in each row and each column of the optical blocks in the array 904 may be moved to their respective reflective positions to redirect each of the optical signals ($112_1, 112_2, \ldots 112_n$) of selective (i.e., different) wavelengths in the second direction 152 to the different optical outputs of the plurality of optical outputs ($122_1, 122_2, \ldots 122_m$). That is, optical signals of different wavelengths may be directed to different optical outputs (i.e. to be transported to different computing nodes).

Figure 10:
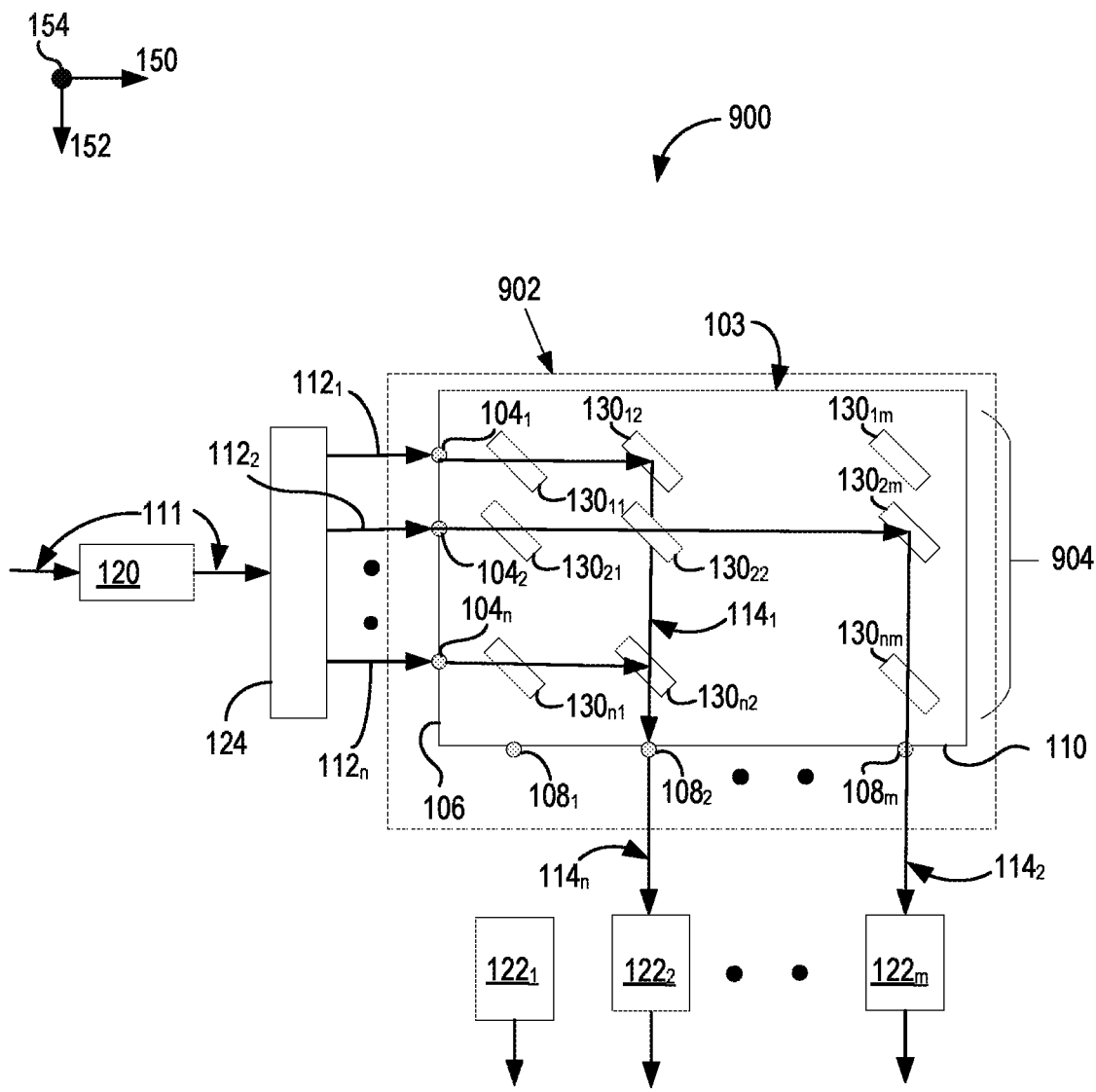
FIG. 10 schematically illustrates a system including an optical device, in yet another example.
Figure 11:
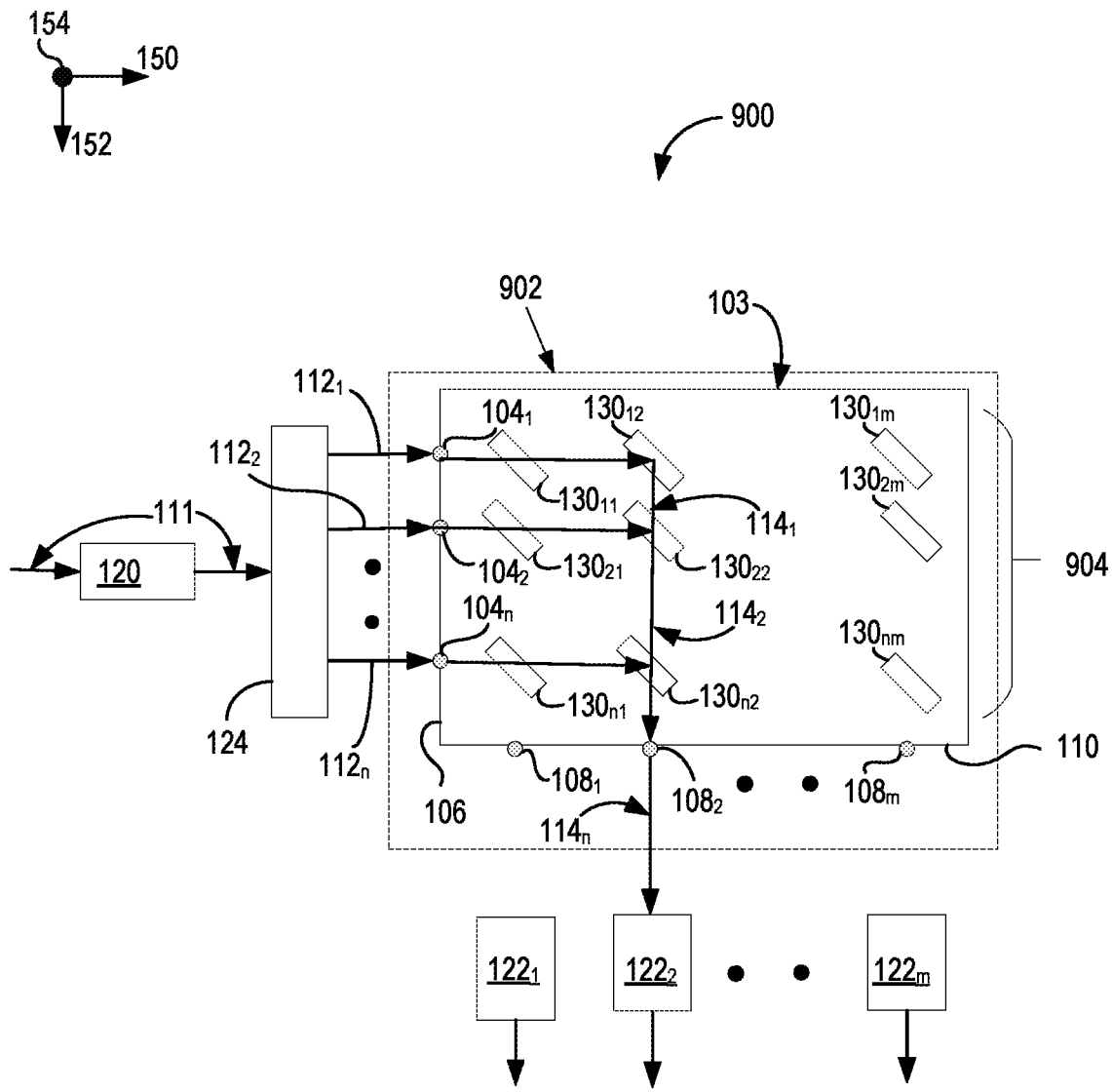
FIG. 11 schematically illustrates a system including an optical device, in yet another example.

FIGS. 10-11 show other examples of the system 900. In the example illustrated in FIG. 10, two optical blocks of different rows and in one column in the array 904 (e.g., $130_{12}$ and $130_{n2}$) may be moved to their respective reflective positions to redirect the two optical signals $112_1$ and $112_n$ of different wavelengths in the second direction 152 to one optical output $122_2$. That is, optical signals of two different wavelengths may be directed to one optical output (to be transported to one computing node). In the example illustrated in FIG. 11, 'n' optical blocks in one column of the array 904 (e.g., $130_{12}$, $130_{22}$, ... $130_{n2}$) may be moved to their respective reflective positions to redirect 'n' optical signals ($112_1$, $112_2$, ... $112_n$) of different wavelengths in the second direction 152 to one optical output $122_2$ of the plurality of optical outputs ($122_1$, $122_2$, ... $122_m$). That is, multiple optical signals of different wavelengths may be directed to one optical output (for example, to be transported to one computing node). In some examples, the system 900 may be utilized to redirect any number of optical signals the plurality of optical signals ($112_1$, $112_2$, ... $112_n$) to one or more optical outputs of the plurality of optical outputs ($122_1$, $122_2$, ... $122_m$).

It should be understood that the above-described examples are merely illustrative of some of the many specific examples that represent the principles described herein. Clearly, those skilled in the art can readily devise numerous other arrangements without departing from the scope as defined by the following claims.

The invention claimed is:

1. An optical device, comprising:
a plurality of input ports to direct a plurality of optical signals of selective wavelengths to a first direction;
a plurality of rows of two or more optical blocks in the first direction and a plurality of columns of two or more optical blocks in a second direction, wherein:
an optical block of the plurality of rows of two or more optical blocks is aligned to an input port of the plurality of input ports;
each of the optical blocks is movable, via an actuator, to a plurality of positions to selectively redirect a respective optical signal of the plurality of optical signals from the first direction to a second direction;
each of the two or more optical blocks in a same row of the plurality of rows of two or more optical blocks comprises a common optical coating to redirect an optical signal of a same wavelength as all other optical blocks in the row; and
each of the two or more optical blocks in a same column of the plurality of columns of two or more optical blocks comprises a different optical coating from other respective optical blocks in the same column such that each of the two or more optical blocks in the same column redirects an optical signal of a different wavelength relative to other optical blocks in the same column; and
a plurality of output ports to receive the one or more optical signals redirected to the second direction.

2. The optical device of claim 1, wherein the second direction is substantially perpendicular to the first direction.

3. The optical device of claim 1, wherein each of the optical blocks is translated to a reflective position of the plurality of positions to redirect the respective optical signal from the first direction to the second direction and a transmissive position to transmit the respective optical signal in the first direction.

4. The optical device of claim 1, wherein each of the optical blocks is translated along the first direction.

5. The optical device of claim 1, wherein each of the optical blocks is translated along a third direction that is orthogonal to the first direction and the second direction.

6. The optical device of claim 1, wherein each of the optical blocks is movable in a rotational direction about the first direction.

7. The optical device of claim 1, wherein each of the optical blocks comprises a mirror.

8. The optical device of claim 1, wherein each of the optical blocks comprises an optical filter.

9. The optical device of claim 1, wherein each of the rows is aligned to an input port of the plurality of input ports and each of the columns is aligned to an output port of the plurality of output ports.

10. The optical device of claim 1, further comprising the actuator to selectively move each of the optical blocks to the plurality of positions.

11. The optical device of claim 10, wherein the actuator is disposed adjacent to one or more optical blocks of the plurality of optical blocks.

12. The optical device of claim 10, wherein the actuator is movable in the first direction.

13. The optical device of claim 10, wherein the actuator is rotatable about its axis.

14. The optical device of claim 13, wherein the actuator comprises a camshaft.

15. An optical device, comprising:
a plurality of input ports to direct a plurality of optical signals of selective wavelengths to a first direction;
optical blocks comprising:
rows, extending in the first direction, each optical block being aligned to a respective input port of the plurality of input ports; and
columns extending in a second direction, wherein each optical block of the optical blocks is moved to a reflective position to redirect the respective optical signal from the first direction to the second direction and a transmissive position to transmit the respective optical signal in the first direction without being redirected; and wherein:
each of individual optical blocks in a row of the rows comprises a common optical coating to redirect an optical signal of a same wavelength as all other optical blocks in the row; and
each of individual optical blocks in a column of the columns comprises a different optical coating from all other optical blocks in the column such that each individual optical block of the optical blocks in the column redirects an optical signal of a different wavelength;
a plurality of output ports to receive the one or more optical signals redirected to the second direction; and
an actuator to selectively move each of the optical blocks to the reflective position and the transmissive position.

16. A system comprising:
an optical input extending in a first direction;
an optical output extending in a second direction; and
an optical device between the optical input and the optical output at the intersection of the first direction and the second direction, to redirect a plurality of optical signals of selective wavelengths transmitted from the optical input to the optical output, wherein the optical device comprises:
a plurality of input ports to direct the plurality of optical signal to the first direction;
an array of optical blocks comprising:
rows, extending in the first direction, each optical block being aligned to a respective input port of the plurality of input ports; and
columns extending in the second direction, wherein each optical block of the optical blocks in the array is moved to a reflective position to redirect the respective optical signal from the first direction to the second direction and a transmissive position to transmit the respective optical signal in the first direction without being redirected; and wherein:

each of individual optical blocks in a row of the rows comprises a common optical coating to redirect an optical signal of a same wavelength as all other optical blocks in the row; and each of individual optical blocks in a column of the columns comprises a different optical coating from all other optical blocks in the column such that each individual optical block of the optical blocks in the column redirects an optical signal of a different wavelength; and a plurality of output ports, each of the output ports aligned to a column of the plurality of columns to receive the one or more optical signals redirected to the second direction.

17. The system of claim 16, wherein the optical input comprises a single-mode waveguide, a multi-mode waveguide or free space.

18. The system of claim 16, wherein the optical output comprises a single-mode waveguide, a multi-mode waveguide or free space.

* * * * *